June 11, 1935.  L. R. E. GRATZMÜLLER  2,004,240
ELECTRIC TRACTION
Filed Sept. 18, 1931   4 Sheets-Sheet 1

INVENTOR
L.R.E. Gratzmuller
BY
Emil Bönnelyche
ATTORNEY

June 11, 1935. L. R. E. GRATZMÜLLER 2,004,240
ELECTRIC TRACTION
Filed Sept. 18, 1931 4 Sheets-Sheet 2

INVENTOR
L.R.E. Gratzmüller
BY
Emil Börnelyche
ATTORNEY

Patented June 11, 1935

2,004,240

UNITED STATES PATENT OFFICE 2,004,240

ELECTRIC TRACTION

Louis René Eugène Gratzmüller, Paris, France

Application September 18, 1931, Serial No. 563,622
In France September 27, 1930

24 Claims. (Cl. 172—179)

The present invention relates to improvements in the method described in French specification No. 643,048 of 27th October, 1927. It comprises a method of regulating the speed of compound dynamos having armatures $A_1$, $A_2$, ... $A_m$, ... $A_n$ and series field windings $K_1$, $K_2$, $K_m$, ... $K_n$ called principal dynamos, producing on their armature shafts motive or resistant powers driving or braking one or more vehicles and permitting principal dynamos to be connected in parallel with approximately appropriate distribution of the currents $i_1$, $i_2$, ... $i_m$, ... $i_n$ passing through them. The principal dynamos may or may not be arranged on the same vehicle. The method consists essentially in utilizing the currents $i_1$, $i_2$, ... $i_m$ ... $i_n$ themselves for influencing the excitation ampere-turns.

It is known that a compound dynamo A having an armature A, and series field winding K may be used, and the speed may be varied by varying the current in a second exciting winding B excited in shunt across the supply system or separately, for running as a motor or with regenerative braking. This is the form of regulation developed by Bacqueyrisse and described by him at the International Congress of Tramways, Railways of Local Interest and Public Motor Transport held in Warsaw on 29th June, 1930.

But it is known that:

*Defect 1.*—If several compound principal dynamos are paralleled, the currents are not, in practice, properly distributed among the various armatures. This even occurs in the special case of dynamos which appear to be identical, especially under small loads and with weak fields, principally if the compounding ampere-turns are few relatively to the ampere-turns of the shunt or separate winding. This is due to the fact that it is impossible to construct strictly identical dynamos, so that for one and the same regulating, the flux of the principal dynamos varies, as well as other constants, such as diameter of the wheels, etc.

*Defect 2.*—There is, however, an advantage in not exaggerating the importance of the compound windings K because, in regeneration it is the difference between the ampere-turns B and K which determines the useful flux in each dynamo, whence the necessity for increasing the weight of copper in the field windings.

The present device permits either both defect 1 or defect 2 or only one of them to be diminished.

Similar dynamos A will be assumed.

*Defect 1.*—It is then a matter of tending to equalize the currents $i_1$ $i_2$, ... $i_n$. It is sufficient to insert in the electric circuit of $B_2$ and in the appropriate sense, a tension which is the difference between the two tensions $e_1$ and $e_2$ increasing respectively with $i_1$ and $i_2$, so that for $i_1=i_2$ we have $e_1-e_2=0$.

This difference $e_1-e_2$ may be obtained by opposing the tensions produced in two armatures of distinct dynamos respectively excited by the currents $i_1$ and $i_2$ or again the differential electromotive force developed in a single armature of a dynamo excited by the difference between the ampere-turns of two field windings through which pass $i_1$ and $i_2$, respectively, and becoming null for $i_1-i_2$.

In the case where the winding B is fed by an exciter $a_2$ $b_2$ having armature $a_2$ $b_2$, the said armature may naturally be required to provide the electromotive force $e_3$, which normally feeds the winding $B_2$, and the tension $e_1-e_2$, so that $e_3$ exists for the excitation of $B_2$ even if $e_1-e_2=0$. It is even possible to compound the exciter $a_2$ $b_2$ so as to reinforce the compounding produced by the winding K. Finally, instead of exciting $a_2$ $b_2$ by several distinct field windings, the sum of the appropriate ampere-turns may be produced in a single field winding of the exciter, in the circuit whereof there is inserted a sum of appropriate tensions, as will be described hereinafter, the said tensions being obtained in exciters of exciters or sub-exciters.

All the auxiliary exciter dynamos, sub-exciters, may be driven by any desired means. All this will be better understood by referring to the diagrams shown by way of example in the accompanying drawings which, moreover, may have other modifications.

If the principal compound dynamos which are to be paralleled are not of the same type or of the same power, the currents $i_1, i_2 \ldots i_n$ must be in suitable ratios still regulable by the said currents $i_1, i_2 \ldots i_m$ or their difference by the methods described.

Figure 1:
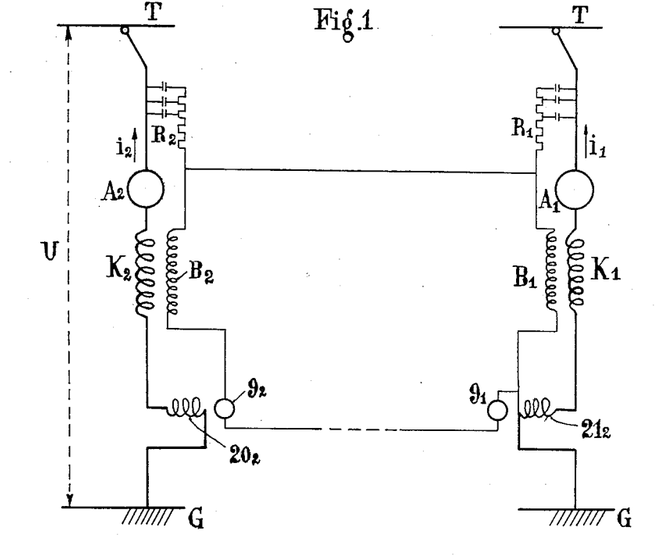
Figure 1 is a diagrammatic representation of a circuit illustrating one form of connecting compound dynamo electric machines in parallel in accordance with the present invention.

Figure 1 shows the simple case of two principal compound dynamos $A_1$ and $A_2$ shunted on the tension supply system V, having poles G and T, which will be the general notation hereinafter. It will be remembered that the two machines may or may not be on the same vehicle. The currents through $B_1$ and $B_2$ may be regulated, in regular running, by one and the same common rheostat, such as R (not shown), or by two rheostats $R_1$ and $R_2$ operated identically. In this latter case, the end terminals of the rheostats may be usefully connected by an equalizing wire, which more particularly remedies the imperfections of the rheostats and of their operation, this being the case in Figure 1. The connecting wire is, moreover, indispensable if there is only one rheostat.

In order to combat defect 1, it is sufficient to insert in the electric circuit $B_2$ and in the appropriate sense, a tension which is the difference between two tensions $e_1$ and $e_2$ produced in the armature $9_1$ and $9_2$ of dynamos $9_1$ and $9_2$ excited respectively by the currents $i_1$ and $i_2$, such that for $i_1=i_2$, $e_1-e_2=0$.

Figure 1A:
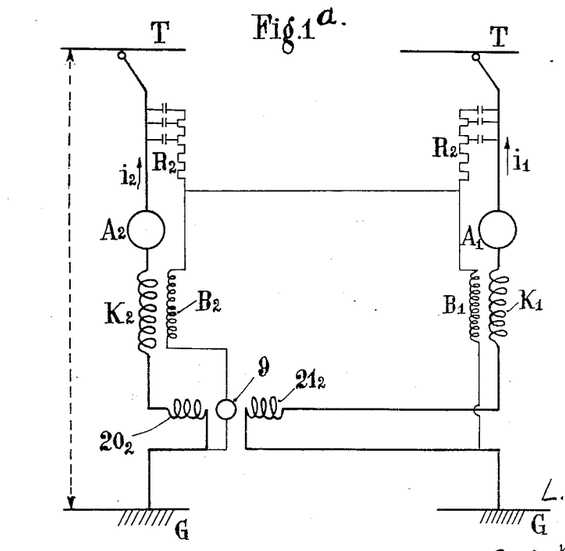
Fig. 1a illustrates a modified form of the present invention.

It is manifest that the armatures $9_2$ and $9_1$ may be combined in a single armature 9 (Figure 1a), the field circuit of which then has two windings $21_2$ and $20_2$, excited respectively by $i_1$ and $i_2$.

Then again, the precision of the regulation may be increased as desired by inserting in $B_2$ not $e_1-e_2$, but (Figure 2) the electromotive force of the armature $9_{23}$ of an auxiliary dynamo excited by the winding $22_2$ under the difference of potential of the electromotive forces of the armatures of two dynamos $9_2$ and $9_1$, excited respectively by the currents $i_2$ and $i_1$.

Rheostatic starting or rheostatic braking for passing the stopping place at the lowest speed of the motors, or vice versa, are known.

The generalization for paralleling any number of dynamos is evident. It consists in utilizing the differences in the currents of the principal dynamos two by two, or the differences of the currents of the dynamos from the current of one of them or from their mean value, as will be explained hereinafter.

Figure 3:
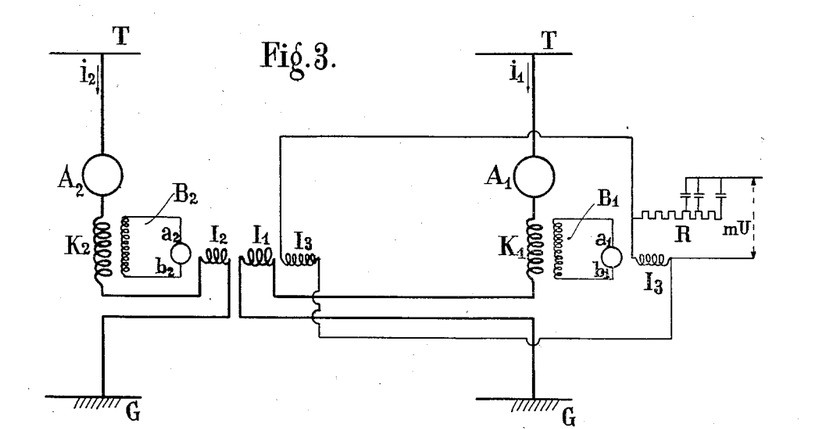
Fig. 3 is a view illustrating a still further modification of the invention herein disclosed.

However, it is possible to utilize advantageously, particularly at very high tension, an exciter $a_2b_2$, the armature $a_2b_2$ of which is connected to the terminals of $B_2$ (Figure 3). It is sufficient, in addition to a winding $I_3$ fed by an auxiliary source $mU$ regulable by means of the rheostat R, to add two antagonistic windings through which pass the currents $i_1$ and $i_2$ developing in the armature $a_2b_2$ the electromotive forces $e_1$ and $e_2$, the effect of which becomes null for $i_1=i_2$.

Figure 4:
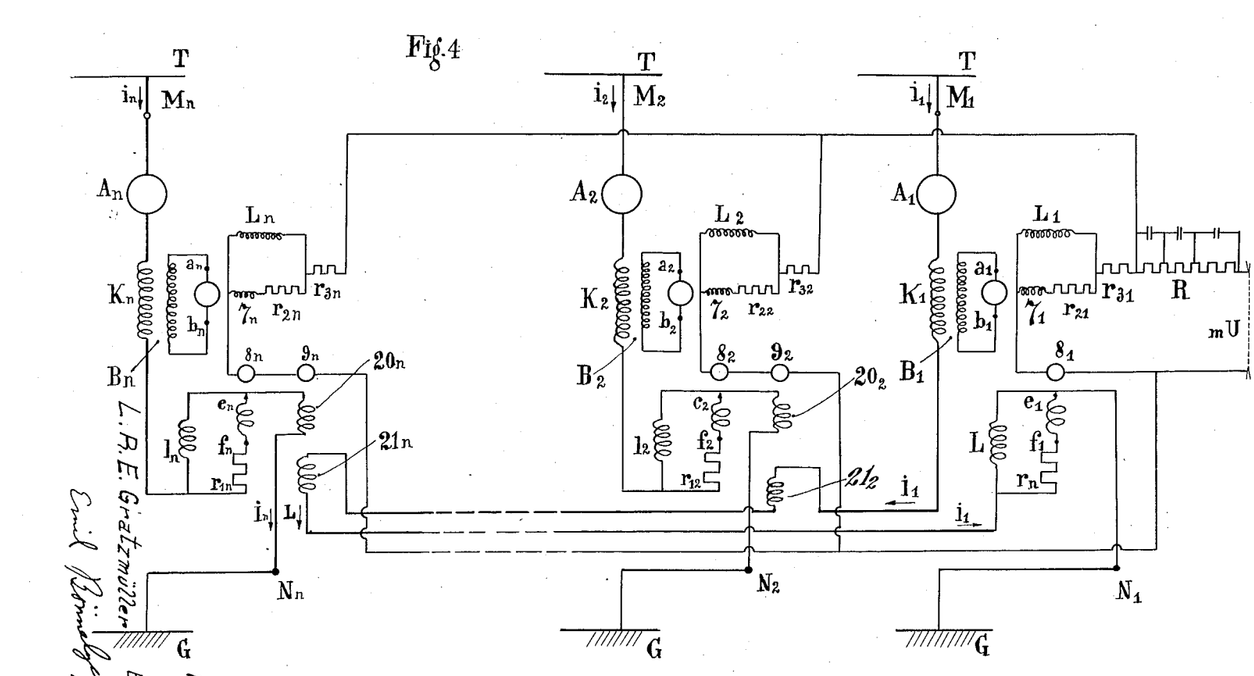
Fig. 4 is a diagrammatic view of the detailed system of carrying out the present invention in which additional modifications are incorporated.

Making use of French specification No. 643,048, we obtain the following diagram (Figure 4).

The group $A_2K_2$ is assumed to be shunted across the tension supply U (not shown). In the electric circuit of the field winding $7_2$ of the exciter $a_2b_2$ having the armature $a_2b_2$ are connected in series:

1. A constant or regulable difference of potential $mU$ ($m$ being any number whatsoever), which may be taken from the tension U of the mains (when $m=1$) or from any auxiliary source whatsoever, such as the rotating armature of a transformer, a battery of accumulators, etc.

2. A fixed resistance $r_{22}$ in series with the field winding $7_2$.

3. A rheostat R which may be common to all the exciters $a_mb_m$.

4. The armature $8_2$ of an exciter or sub-exciter, through the field winding $e_2f_2$ of which there passes the current $i_2$ of the armature $A_2$ as provided in French specification No. 643,048. The armature $8_2$ will increase the current passing through $B_2$ with increase in $i_2$ when $A_2$ is running as a motor and will diminish it when $A_2$ is running with regeneration.

It has for its object to remedy the defect 2.

5. Where several armatures $A_1, A_2 \ldots A_n$ are arranged in several shunts on the supply system, the armature $9_2$ of a second sub-exciter, differentially excited by the currents $i_1$ and $i_2$, is connected in series. For this purpose, the said sub-exciter is provided with two separate field windings, through one $20_2$ of which passes the current $i_2$, while through the other $21_2$ passes the current $i_1$. The winding $20_2$ would alone produce an electromotive force $e_2$ of the same sign in the electric circuit of the winding $7_2$ as that of the armature $8_2$. It will readily be seen that the armature $9_2$ tends to equalize the currents $i_1$ and $i_2$ by increasing or diminishing the excitation of $a_2b_2$ and consequently that of the dynamo $A_2$. It will be understood that the electromotive force developed in $9_2$ by the current $i_2$ may be taken from the armature $8_2$, that is to say, the winding $20_2$ may be abolished. It is even possible to generate in a single armature the electromotive force generated by the current $i_2$ in $8_2$, and also the differential electromotive forces generated in $9_2$ by the currents $i_1$ and $i_2$. It is sufficient to excite this single armature by the currents $i_1$ and $i_2$ passing through field windings having a suitable number of turns.

A choking coil $L_2$ of low resistance may be shunted across the end terminals of the group comprising in series the field winding $7_2$ and the resistance $r_{22}$.

If this arrangement is employed, a resistance $r_{32}$ will be inserted in front of the entire group.

Likewise, it is possible to provide at the terminals of the entire system comprising in series the resistance $r_{12}$ and the field winding $e_2f_2$ of of the armature $8_2$ a choking coil $l_2$ of low resistance (see article by Gratzmüller in the Bulletin de la Societe Francaise des Electriciens—Bulletin for October, 1929, No. 98, vol. IX).

The dynamo $A_1$ will be excited in the same way, but the differentially excited sub-exciter, which would be denoted by $9_1$, will be dispensed with. In other words, the whole of its circuit diagram would be the same as that of the dynamo $A_2$ less the dynamo $9_1$. For the reference letters, the index 2 will be replaced by the numeral 1. For example, the dynamo $8_2$ will be replaced by the dynamo $8_1$. The rheostat R is supposed to be single.

A distinct rheostat $Rm$ may be provided for each dynamo $Am$, all the rheostats $Rm$ being operated in the same way and preferably provided with an equalizing wire between them. The terms $Rm$ and $Am$ are used to indicate theoretical generalizations.

The same would apply for the excitation diagrams of the dynamos $A_3$, $A_4$ ... $A_n$ which would comprise the dynamos $9_3$, $9_4$ ... $9_n$ excited differentially respectively by the currents $i_1$ and $i_3$, $i_1$ and $i_4$, $i_1$ and $i_n$. For each principal dynamo $A_m$, the index $m$ will replace the index 2 for each element of the excitation.

In this way, all the currents $i_1$, $i_2$, $i_3$, $i_n$ will, due to the sub-exciters $9_2$, $9_3$ ... $9_n$, be brought to differ but slightly from the current $i_1$ The function of the different elements of the excitation may now be stated.

1. The variation of $mU$, or the operation of the rheostat R permit of the regulation of the tension of the armature $a_2b_2$ and consequently of the current $i_2$ in normal running. Regulation of $mU$ or R is what will be called regulation of the excitation of the principal dynamo $A_2$ by the driver of the vehicle or more simply regulation.

Actually, the excitation of $A_2$ will vary for other reasons in variable running, but will be independent of the desire of the driver of the vehicle.

2. The winding $K_2$ has chiefly a function in the rapid transitory periods when the line voltage varies suddenly. It permits the resistances called stabilizing resistances to be dispensed with (see the above mentioned article by Gratzmüller).

3. The dynamo $8_2$, due to its field winding $e_2$ $f_2$, produces an over-excitation of $B_2$ if $i_1$ increases during running as a motor and a de-excitation in braking running. Consequently, it tends to diminish the excess intensity of $i_2$. It may be remarked that the winding $K_2$ and the dynamo $8_2$ are two elements which, to some extent, supplement one another, because they both tend to cause the flux of $A_2$ to increase with $i_2$ during running as a motor and to cause it to decrease during regenerative running.

The suppression or the reduction of one of these two elements may therefore be considered.

4. The function of the sub-exciter $9_2$ has already been explained, and tends to equalize the currents $i_1$, $i_2$, $i_3$ ... $i_n$ when the dynamos $A_1$, $A_2$, $A_n$ are working in parallel.

5. The choking coils $L_2$ and $l_2$, which are possibly provided, increase the rapidity of the variation of the current, during the rapid transitory periods, in the field windings which they shunt. In a general manner, all the elements of the diagram tend to limit the excess intensities of the currents $i$ and to equalize them. As a modification, it is possible to consider the suppression of the electromotive force produced by the differential dynamo $9_2$ in the circuit of the field windings $l_2$ and to introduce it into the electric circuit of the field winds $B_2$, by an armature $9_2$ excited in the same way. The commutator of $9_2$, however, may then be designed for the excitation current of the field winding B which is much greater than that of $l_2$.

It is easy to see that in each shunt, it is possible to connect in series several principal armatures with their series windings, and that the corresponding field windings B, previously connected in series or in parallel, may be inserted in an electric circuit comprising only one exciter. The whole of the armatures and their field windings, remaining for example in series, may be considered as symbolized in the diagrams by a single symbolic armature $A_m$ of greater electromotive force having a field winding $K_m$ and a single winding $B_m$. Such is the case, for example, of twin motors.

Finally, it is evidently possible to provide couplings for altering the number of the shunts on the supply system of the groups A and K. The circuits of the field windings B may remain, but it will be necessary to modify the values of the resistances of the excitation rheostats R for the windings B or the excitation values of the tensions $mU$.

In other words, the alterations of coupling will only be effected on the AK's or series motor parts. These alterations of coupling are evidently possible by complete disconnection of the A shunts on the supply system and then connection of new couplings to the supply line after regulation of the excitations with or without insertion of passage resistances.

This, however, may also be effected without complete disconnection from the supply system of the shunts containing the A's by utilizing passage resistances with a method similar to that of the bridge.

A device for the different connections to be made for starting, and the alterations in coupling for running as motor or with regeneration up to stopping, including rheostatic braking are known.

Mr. Lievre has described a solution for this in a report presented to the "Union des Voies Ferrees et des Transports Automobiles a la Reunion d'Alger", 1930, for the case for the passage from series to parallel of two motors for running as motor or with regeneration. It could easily be extended to the case of more than two motors.

With the sub-exciter device, it is evident that the windings denoted by the letter K must always comprise in series the windings of the auxiliary poles of the corresponding motors then the resistances $r_{12}$ and the field windings $e_2$ $f_2$ and $20_2$ of the sub-exciters, that is to say, that the groups AK designate everything included in series with the A's in one shunt, for example, in the diagram between the points $M_1$, $N_1$, $M_2$, $N_2$ and $M_n$, $N_n$ in Figure 4. It is obvious that, instead of introducing into the excitation circuit the electromotive force of the armature $9_2$ excited by the difference between the currents $i_1$ and $i_2$, it is possible to introduce the difference between the electromotive forces of two like dynamos rotating at the same speed, one being excited by the current $i_1$ and the other by the current $i_2$.

This will be a considerable advantage in the case of several separate vehicles, because it will be possible to avoid, between vehicles, cables through which pass heavy currents. The rest of the invention obviously remains.

Figure 5:
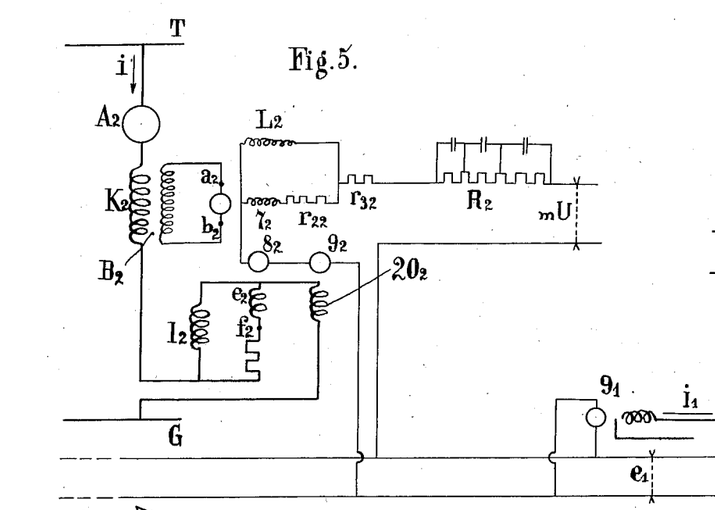
Fig. 5 is a view illustrating an arrangement somewhat similar to that shown in Fig. 4 but differing therefrom by reason of a still further modification.

Figure 5 shows the modification to be introduced, for any one of the shunts $A_2$, $K_2$, in the excitation circuit of the exciters. In place of a single armature $9_2$ two armatures are used, one $9_1$ excited by the current $i_1$ and the other $9_2$ by the current $i_2$, giving respectively the electromotive forces $e_1$ and $e_2$. It is evident that the electromotive force $e_1$ being the same for all the exciter excitation windings $l_2$, $l_3$ ... $l_n$, $e_1$ may be distributed by transmission lines from one to the other of all the vehicles.

Figure 6:
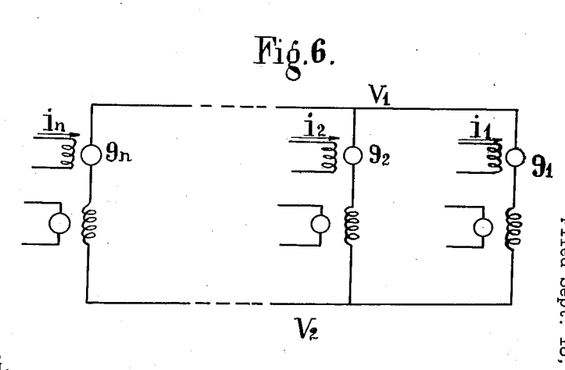
Fig. 6 is a fragmentary diagrammatic view of a portion of a circuit which may be employed in conjunction with the circuits shown in the preceding figures.

A wiring diagram (Figure 6) may be adopted which is interesting on account of its symmetry and which will be particularly advantageous in the case of $n$ principal dynamos distributed among separate vehicles. Between two common points $V_1$ and $V_2$ or between two conductors $V_1$ and $V_2$ of small negligible resistance, there are arranged in shunt in $n$ bridges $n$ armatures of auxiliary dynamos $9_1$ and $9_2 \ldots 9_n$ which for the sake of simplicity will be assumed to be indentical, a condition which is not indispensable, in that they rotate, for example, at the same speed. The dynamos, respectively excited by means of field windings through which pass the currents $i_1$, $i_2$ ... $i_n$ in such a manner that for $i_1 = i_2 = \ldots i_n$ we have $e_1 = e_2 = \ldots e_n$. Assume the shunts $9_1$, $9_2 \ldots 9_n$ to be of the same resistance $r$ adjusted to requirements. It is easy to show that the current in any one shunt $m$ is:

$$I_m = \frac{e_m - \frac{1}{n}(e_1 + e_2 + \ldots e_n)}{r} = \frac{e_m - e \text{ mean}}{r}$$

Figure 2:
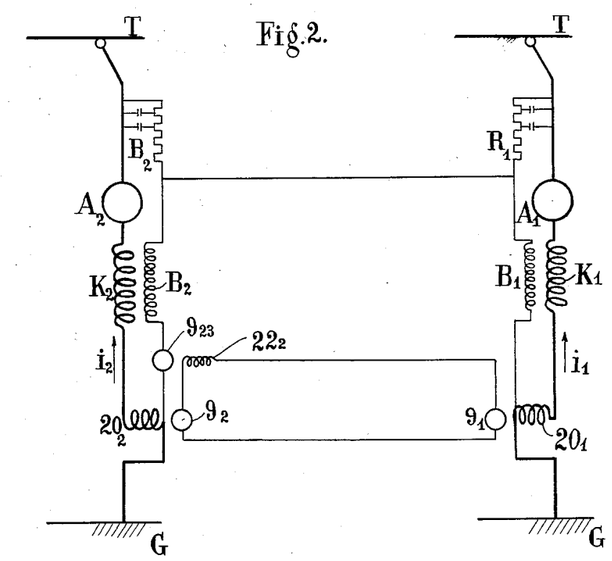
Fig. 2 is a view showing a further modified form of the present invention.

By inserting in each of the bridges the field windings of dynamos, the armatures of the latter will generate differential electromotive forces utilized in any one of the foregoing diagrams, for example those of Figures 2 and 5. In short, the electromotive force $e_1$ will be replaced by the mean electromotive force $e$ in the differential electromotive forces utilized in the foregoing. They will be inserted either in the windings B or in the field windings of exciters or of exciters of exciters.

It is evident that any excitation device of the exciter of one of the windings B of one of the motors A may be applied to the excitation of the field windings of an exciter of this exciter. This may be applied, for example, to the form of excitation shown in the diagram of Figure 3.

I claim:—

1. A method of simultaneously operating a plurality of compound dynamos in parallel with each other and a base compound dynamo, comprising applying to a field circuit of each of said compound dynamos a potential generated by a differential field through which the currents flowing through the respective dynamo armatures pass.

2. A method of simultaneously operating a plurality of compound dynamos in parallel with each other and a base compound dynamo, comprising applying to a field circuit of each of said compound dynamos a potential produced in a generator excited by a controlled current, and a differential of the currents flowing through armatures of the respective dynamos.

3. A method of simultaneously operating a plurality of compound dynamos in parallel with each other and a base compound dynamo, comprising applying to a field circuit of each of said compound dynamos a potential produced in a generator excited by a controlled current and a current produced in a generator excited by a differential field through which the armature currents of the respective dynamos flow.

4. In a system of control the combination of a plurality of compound dynamo-electric machines severally having armatures and series and shunt field windings, one of said machines constituting a base machine, means for connecting the armatures and field windings to a common current supply line, and means in series with the shunt field winding of each of said compound dynamo-electric machines except one base machine for generating a potential, said generating means of each machine being excited by two field windings, one of which is connected in series with the armature of the machine to which the generating means is connected and the other being connected in series with the armature of the base machine, whereby the currents flowing through the armatures of the base machine and each of the other machines will be equalized.

5. A method of simultaneously operating a plurality of compound dynamos in parallel with each other and a base compound dynamo, comprising applying to a shunt field circuit of each of said compound dynamos a potential, a pair of opposed generators connected in series with the shunt field circuit of one of said machines, one of said generators having a field winding connected in series with the armature of one of said machines and the other generator having a field winding connected in series with the armature of the other machine, whereby the currents flowing through said armatures will be equalized.

6. In a system of control the combination of a plurality of compound dynamo-electric machines severally having armatures and series and shunt field windings, one of said machines constituting a base machine, means for connecting the armatures and field windings to a common current supply line, and means in series with the shunt field winding of each of said compound dynamo-electric machines except the base machine for generating a potential, said generating means of each machine being excited by a field winding connected in series with generating means excited by current passing through the armature of the machines with which the potential generating means is connected and by current passing through the armature of the base machine.

7. In a system of control the combination of a plurality of compound dynamo-electric machines severally having armatures and series and shunt field windings, one of said machines constituting a base machine, means for connecting the armatures and field windings to a common current supply line, and means in series with the shunt field winding of each of said compound dynamo-electric machines except one base machine for generating a potential, said generating means of each machine being excited by a field winding connected in series in a circuit including a pair of opposed generators, one of the opposed generators being excited by current flowing through the armature of the dynamo-electric machine and the other opposed generator being excited by current passing through the armature of the base machine.

8. In a system of control the combination of a plurality of compound dynamo-electric machines severally having armatures and series and shunt field windings, one of said machines constituting a base machine, means for connecting the armatures and series field windings to a common supply line, means for connecting the shunt field winding of each machine to an individual exciting generator, a circuit connecting a field winding of each of the exciting generators in parallel with a supply line, the exciting generator associated with each machine except a base machine having two additional opposed field windings, one of which is connected in series with the armature of the machine with which the exciting generator is associated and the other being connected in series with the armature of the base machine.

9. In a system of control the combination of a plurality of compound dynamo-electric machines severally having armatures and series and shunt field windings, one of said machines constituting a base machine, means for connecting the armatures and series field windings to a common current supply line, means for connecting the shunt field winding of each machine to an individual exciting generator, a circuit connecting a field winding of each of the exciting generators in parallel with a supply line, a sub-exciter connected in series with the field winding of each exciting generator, the field of each sub-exciter being connected in series with the armature of the machine with which it is associated, a second sub-exciter connected in series with the field winding of each exciting generator other than that associated with a base machine, said second sub-exciter having opposed field windings, one of which is connected in series with the armature of the machine with which it is associated and the other of which is connected in series with the armature of the base machine.

10. In a system of control the combination of a plurality of compound dynamo-electric machines severally having armatures and series and shunt field windings, one of said machines constituting a base machine, means for connecting the armatures and series field windings to a common current supply line, means for connecting the shunt field winding of each machine to an individual exciting generator, a circuit connecting a field winding of each of the exciting generators in parallel with a supply line, a sub-exciter connected in series with the field winding of each exciting generator, the field of each sub-exciter being connected in series with the armature of the machine with which it is associated, a second sub-exciter connected in series with the field winding of each exciting generator other than that associated with a base machine, said second sub-exciter having a field winding in series with the armature of the machine with which it is associated, and a common third sub-exciter connected in series with the sub-exciters associated with each machine, said third sub-exciter having a field winding connected in series with the armature of the base machine.

11. In a system of control the combination of a plurality of compound dynamo-electric machines severally having armatures and series and shunt field windings, one of said machines constituting a base machine, means for connecting the armatures and series field windings to a common current supply line, means for connecting the shunt field winding of each machine to an individual exciting generator, a circuit connecting a field winding of each of the exciting generators in parallel with a supply line, a sub-exciter connected in series with the field winding of each exciting generator, the field of each sub-exciter being connected in series with the armature of the machine with which it is associated, a second sub-exciter connected in series with the field winding of each exciting generator other than that associated with a base machine, said second sub-exciter having opposed field windings, one of which is connected in series with the armature of the machine with which it is associated and the other of which is connected in series with the armature of the base machine, a resistance in series with the field winding of the exciting generator, and a choke coil shunted across the winding and resistance.

12. In a system of control the combination of a plurality of compound dynamo-electric machines severally having armatures and series and shunt field windings, one of said machines constituting a base machine, means for connecting the armatures and series field windings to a common current supply line, means for connecting the shunt field winding of each machine to an individual exciting generator, a circuit connecting a field winding of each of the exciting generators in parallel with a supply line, a sub-exciter connected in series with the field winding of each exciting generator, the field of each sub-exciter being connected in series with the armature of the machine with which it is associated, a second sub-exciter connected in series with the field winding of each exciting generator other than that associated with a base machine, said second sub-exciter having opposed field windings, one of which is connected in series with the armature of the machine with which it is associated and the other of which is connected in series with the armature of the base machine, a resistance in series with the field winding of the exciting generator, a choke coil shunted across the winding and resistance, a resistance in series with the field winding of the first sub-exciter, and a choke coil shunted across said last-mentioned resistance and winding.

13. In a system of control the combination of a plurality of compound dynamo-electric machines severally having armatures and series and shunt field windings, one of said machines constituting a base machine, means for connecting the armatures and series field windings to a common current supply line, means for connecting the shunt field winding of each machine to an individual exciting generator, a circuit connecting a field winding of each of the exciting generators in parallel with a supply line, a sub-exciter connected in series with the field winding of each exciting generator, the field of each sub-exciter being connected in series with the armature of the machine with which it is associated, a second sub-exciter connected in series with the field winding of each exciting generator other than that associated with a base machine, said second sub-exciter having a field winding in series with the armature of the machine with which it is associated, and a common third sub-exciter connected in series with the sub-exciters associated with each machine, said third sub-exciter having a field winding connected in series with the armature of the base machine, a resistance in series with the field winding of the exciting generator, and a choke coil shunted across the winding and resistance.

14. In a system of control the combination of a plurality of compound dynamo-electric machines severally having armatures and series and shunt field windings, one of said machines constituting a base machine, means for connecting the armatures and series field windings to a common current supply line, means for connecting the shunt field winding of each machine to an individual exciting generator, a circuit connecting a field winding of each of the exciting generators in parallel with a supply line, a sub-exciter connected in series with the field winding of each exciting generator, the field of each sub-exciter being connected in series with the armature of the machine with which it is associated, a second sub-exciter connected in series with the field winding of each exciting generator other than that associated with a base machine, said second sub-exciter having a field winding in series with the armature of the machine with which it is associated, and a common third sub-exciter connected in series with the sub-exciters associated with each machine, said third sub-exciter having a field winding connected in series with the armature of the base machine, a resistance in series with the field winding of the exciting generator, a choke coil shunted across the winding and resistance, a resistance in series with the field winding of the first sub-exciter, and a choke coil shunted across said last-mentioned resistance and winding.

15. In a system of control the combination of a plurality of compound dynamo-electric machines severally having armatures and series and shunt field windings, means for connecting the armatures and series field windings to a common supply line, means for connecting the shunt field winding of each machine to an individual exciting generator, a plurality of auxiliary dynamos operating at the same speed and corresponding in number to the number of machines, each having a field winding, the field winding of one of said auxiliary dynamos being connected in series with the armature of its corresponding machine so that each of the auxiliary dynamos is excited by the armature current of a different machine, and means for connecting all of said auxiliary dynamos in parallel with each other and for connecting each auxiliary dynamo in series with the field winding of its associated exciting generator.

16. A method of regulating compound dynamos, each of which is arranged in one of two shunts of a supply system and each of which has a series field winding connected directly in series with the armature and a second field winding separately excited, comprising producing a first tension which is regulable and independent of armature current, producing a second tension which increases with the armature current, algebraically combining the first and second tension and passing them through the separately excited winding, each in such a sense that during running of the compound dynamo as a motor the ampere-turns which would produce separately each of the two tensions in the separately excited field winding of the compound dynamo and those of the said dynamo which are excited directly in series are in the same sense.

17. A method of regulating compound dynamos, each of which is arranged in one of two shunts of a supply system and each of which has a series field winding connected directly in series with the armature and a second field winding separately excited, comprising producing a first tension which is regulable and independent of armature current, producing a second tension which increases with the armature current, algebraically combining the first and second tension and passing them through a winding of an exciter, and passing the current generated in the exciter through the separately excited winding of the dynamo, the first and second tensions passing through the winding of the exciter in such a sense that during running of the compound dynamo as a motor the ampere-turns which would produce separately each of the two tensions in the separately excited field winding of the compound dynamo and those of the said dynamo which are excited directly in series are in the same sense.

18. A method of regulating compound dynamos, each of which is arranged in one of two shunts of a supply system and each of which has a series field winding connected directly in series with the armature and a second field winding separately excited, comprising producing a first tension which is regulable and independent of armature current, producing a second tension which increases with the armature current, algebraically combining the first and second tension and passing them through a winding of an exciter, and passing the current generated in the exciter through the separately excited winding of the dynamo, the first and second tensions passing through the winding of the exciter in such a sense that during running of the compound dynamo as a motor the ampere-turns which would produce separately each of the two tensions in the separately excited field winding of the compound dynamo and those of the said dynamo which are excited directly in series are in the same sense, and hastening temporarily the variation of flux produced by a field winding through which passes a current by shunting a choking coil across the entire system constituted by the field winding connected in series with a resistance.

19. A method of regulating compound dynamos each disposed in a shunt of a supply system and each of which has a series field winding connected directly in series with the armature and a second field winding separately excited, comprising producing a first tension which is regulable and independent of armature current, producing a second tension which increases with the armature current, algebraically combining the first and second tension and passing them through the separately excited winding, each in such a sense that during running of the compound dynamo as a motor the ampere-turns which would produce separately each of the two tensions in the separately excited field winding of the compound dynamo and those of the said dynamo which are excited directly in series are in the same sense.

20. A method of regulating compound dynamos each disposed in a shunt of a supply system and each of which has a series field winding connected directly in series with the armature and a second field winding separately excited, comprising producing a first tension which is regulable and independent of armature current, producing a second tension which increases with the armature current, algebraically combining the first and second tensions and passing them through a winding of an exciter, and passing the current generated in the exciter through the separately excited winding of the dynamo, the first and second tensions passing through the winding of the exciter in such a sense that during running of the compound dynamo as a motor the ampere-turns which would produce separately each of the two tensions in the separately excited field winding of the compound dynamo and those of the said dynamo which are excited directly in series are in the same sense.

21. A method of regulating compound dynamos each disposed in a shunt of a supply system and each of which has a series field winding connected directly in series with the armature and a second field winding separately excited, comprising producing a first tension which is regulable and independent of armature current, producing a second tension which increases with the armature current, algebraically combining the first and second tensions and passing them through a winding of an exciter, and passing the current generated in the exciter through the separately excited winding of the dynamo, the first and second tensions passing through the winding of the exciter in such a sense that during running of the compound dynamo as a motor the ampere-turns which would produce separately each of the two tensions in the separately excited field winding of the compound dynamo and those of the said dynamo which are excited directly in series are in the same sense, and hastening temporarily the variation of flux produced by a field winding through which passes a current by shunting a choking coil across the entire system constituted by the field winding connected in series with a resistance.

22. A method of regulating a compound dynamo disposed in a shunt of a supply system and which has a series field winding connected directly in series with the armature and a second field winding separately excited, comprising producing a first tension which is regulable and independent of armature current, producing a second tension which increases with the armature current, algebraically combining the first and second tension and passing them through the separately excited winding, each in such a sense that during running of the compound dynamo as a motor the ampere-turns which would produce separately each of the two tensions in the separately excited field winding of the compound dynamo and those of the said dynamo which are excited directly in series are in the same sense.

23. A method of regulating a compound dynamo disposed in a shunt of a supply system and which has a series field winding connected directly in series with the armature and a second field winding separately excited, comprising producing a first tension which is regulable and independent of armature current, producing a second tension which increases with the armature current, algebraically combining the first and second tension and passing them through a winding of an exciter, and passing the current generated in the exciter through the separately excited winding of the dynamo, the first and second tensions passing through the winding of the exciter in such a sense that during running of the compound dynamo as a motor the ampere-turns which would produce separately each of the two tensions in the separately excited field winding of the compound dynamo and those of the said dynamo which are excited directly in series are in the same sense.

24. A method of regulating a compound dynamo disposed in a shunt of a supply system and which has a series field winding connected directly in series with the armature and a second field winding separately excited, comprising producing a first tension which is regulable and independent of armature current, producing a second tension which increases with the armature current, algebraically combining the first and second tension and passing them through a winding of an exciter, and passing the current generated in the exciter through the separately excited winding of the dynamo, the first and second tensions passing through the winding of the exciter in such a sense that during running of the compound dynamo as a motor the ampere-turns which would produce separately each of the two tensions in the separately excited field winding of the compound dynamo and those of the said dynamo which are excited directly in series are in the same sense, and hastening temporarily the variation of flux produced by a field winding through which passes a current of shunting a choking coil across the entire system constituted by the field winding connected in series with a resistance.

LOUIS, RENÉ EUGÈNE, GRATZMULLER.